(12) United States Patent
Son et al.

(10) Patent No.: US 10,629,374 B2
(45) Date of Patent: Apr. 21, 2020

(54) COMPOSITE ELECTRONIC COMPONENT AND BOARD HAVING THE SAME

(71) Applicant: SAMSUNG ELECTRO-MECHANICS CO., LTD., Suwon-si, Gyeonggi-do (KR)

(72) Inventors: Soo Hwan Son, Suwon-si (KR); Young Ghyu Ahn, Suwon-si (KR); Man Su Byun, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/995,899

(22) Filed: Jun. 1, 2018

(65) Prior Publication Data
US 2019/0157005 A1    May 23, 2019

(30) Foreign Application Priority Data
Nov. 20, 2017   (KR) ........................ 10-2017-0154591

(51) Int. Cl.
*H01G 4/30* (2006.01)
*H01G 4/12* (2006.01)
*H01G 2/06* (2006.01)
*H01G 4/35* (2006.01)
*H01G 4/012* (2006.01)
*H01G 4/232* (2006.01)

(52) U.S. Cl.
CPC .............. *H01G 4/12* (2013.01); *H01G 2/06* (2013.01); *H01G 4/012* (2013.01); *H01G 4/232* (2013.01); *H01G 4/30* (2013.01); *H01G 4/35* (2013.01)

(58) Field of Classification Search
CPC ........ H01G 4/008; H01G 4/006; H01G 4/012; H01G 4/12; H01G 4/30; H01G 4/35; H01G 4/232; H01G 2/06; H01G 4/1227
See application file for complete search history.

(56) References Cited

U.S. PATENT DOCUMENTS

| 9,620,288 B2 * | 4/2017 | Hattori ..................... H01G 4/30 |
| 10,438,040 B2 * | 10/2019 | Strohmann .......... G06K 9/0002 |
| 2013/0120899 A1 | 5/2013 | Chung et al. |

(Continued)

FOREIGN PATENT DOCUMENTS

| JP | 5012658 B2 | 8/2012 |
| JP | 2013-106037 A | 5/2013 |

(Continued)

*Primary Examiner* — Nguyen T Ha
(74) *Attorney, Agent, or Firm* — Morgan, Lewis & Bockius LLP

(57) ABSTRACT

A composite electronic component includes a composite body including: a multilayer ceramic capacitor including a first ceramic body including a plurality of dielectric layers and first and second internal electrodes disposed to face each other with respective dielectric layers interposed therebetween and stacked to be perpendicular to a lower surface of the first ceramic body, and a ceramic chip being coupled to the multilayer ceramic capacitor and disposed on a lower portion of the multilayer ceramic capacitor, the ceramic chip including a second ceramic body, first and second terminal electrodes disposed on upper and lower portions of the second ceramic body and connected to the first and second external electrodes, respectively.

18 Claims, 8 Drawing Sheets

(56) References Cited

U.S. PATENT DOCUMENTS

| | | | | |
|---|---|---|---|---|
| 2013/0120900 A1* | 5/2013 | Chung | ............... | H01G 4/005 |
| | | | | 361/303 |
| 2014/0160619 A1* | 6/2014 | Kim | ............... | H01G 4/30 |
| | | | | 361/301.4 |
| 2014/0268487 A1 | 9/2014 | Yoshida | | |
| 2014/0284089 A1 | 9/2014 | Hattori et al. | | |
| 2015/0041195 A1* | 2/2015 | Ahn | ............... | H01G 2/065 |
| | | | | 174/260 |
| 2015/0122534 A1* | 5/2015 | Park | ............... | H01G 2/065 |
| | | | | 174/260 |
| 2015/0270065 A1* | 9/2015 | Hattori | ............... | H01G 2/065 |
| | | | | 174/255 |
| 2016/0007446 A1* | 1/2016 | Ishikawa | ............... | H05K 1/113 |
| | | | | 174/260 |
| 2016/0133386 A1 | 5/2016 | Park et al. | | |

FOREIGN PATENT DOCUMENTS

| | | |
|---|---|---|
| JP | 2014-179512 A | 9/2014 |
| JP | 2014-179583 A | 9/2014 |
| JP | 2014-207422 A | 10/2014 |
| KR | 10-2016-0055424 A | 5/2016 |

\* cited by examiner

COMPOSITE ELECTRONIC COMPONENT AND BOARD HAVING THE SAME

CROSS-REFERENCE TO RELATED APPLICATION(S)

This application is based on and claims the benefit of priority to Korean Patent Application No. 10-2017-0154591 filed on Nov. 20, 2017 in the Korean Intellectual Property Office, the entire disclosure of which is incorporated herein by reference.

TECHNICAL FIELD

The present disclosure relates to a composite electronic component and a board having the same.

BACKGROUND

A multilayer ceramic capacitor, a multilayer electronic component, is a chip type condenser mounted on the circuit boards of various electronic products, such as display devices, including liquid crystal displays (LCDs), plasma display panels (PDPs), or the like, computers, personal digital assistants (PDAs), mobile phones, and the like, to serve to charge electricity or discharge electricity.

This multilayer ceramic capacitor (MLCC) may be used as a component in various electronic apparatuses due to advantages such as a small size, high capacitance, and ease of mountability.

The multilayer ceramic capacitor may have a structure in which a plurality of dielectric layers and internal electrodes disposed between the dielectric layers and having different polarities are alternately stacked.

Since the dielectric layer as described above has piezoelectricity and electrostriction, when a direct current (DC) or alternating current (AC) voltage is applied to the multilayer ceramic capacitor, a piezoelectric phenomenon may occur between the internal electrodes, thereby generating vibrations.

These vibrations are transferred to a circuit board on which the multilayer ceramic capacitor is mounted through external electrodes of the multilayer ceramic capacitor, such that an entire circuit board becomes a sound reflecting surface to transmit the sound of vibrations as noise.

The sound of vibrations may correspond to an audio frequency range of 20 to 20,000 Hz potentially causing user discomfort. The vibration noise causing listener discomfort as described above is called acoustic noise.

In accordance with the recent trend toward slimness and miniaturization of electronic devices, the multilayer ceramic capacitor has been used together with a printed circuit board in an environment of high voltage and large voltage change, and thus, the acoustic noise may be sufficiently recognized by a user.

Therefore, a novel product capable of decreasing acoustic noise has been continuously demanded.

Meanwhile, research into a composite electronic component in which a printed circuit board was used below a multilayer ceramic capacitor in order to decrease acoustic noise has been conducted.

However, in this case, acoustic noise may be decreased, but since a current path is extended when an alternating current voltage is applied, a side effect that equivalent series inductance (ESL) is increased may occur.

SUMMARY

An aspect of the present disclosure may provide a composite electronic component capable of simultaneously decreasing acoustic noise and ESL, a board having the same.

According to an aspect of the present disclosure, a composite electronic component may include a composite body including: a multilayer ceramic capacitor including a first ceramic body including a plurality of dielectric layers and first and second internal electrodes disposed to face each other with respective dielectric layers interposed therebetween and stacked to be perpendicular to a lower surface of the first ceramic body, and first and second external electrodes disposed on the lower surface of the first ceramic body; and a ceramic chip being coupled to the multilayer ceramic capacitor and disposed on a lower portion of the multilayer ceramic capacitor, the ceramic chip including a second ceramic body, first and second terminal electrodes disposed on upper and lower portions of the second ceramic body and connected to the first and second external electrodes, respectively, a first via electrode penetrating through the second ceramic body to thereby be connected to the first terminal electrode, and a second via electrode penetrating through the second ceramic body to thereby be connected to the second terminal electrode, in which the first and second internal electrodes include first and second leads exposed to the lower surface of the first ceramic body, respectively, and the first and second leads are spaced apart from each other by a first predetermined interval, and the first and second via electrodes are spaced apart from each other by a second predetermined interval.

According to another aspect of the present disclosure, a board having a composite electronic component may include: a printed circuit board on which a plurality of electrode pads are formed; the composite electronic component as described above, mounted on the printed circuit board; and a solder connecting the electrode pads and the composite electronic component to each other.

According to still another aspect of the present disclosure, a composite electronic component may include a composite body including: a multilayer ceramic capacitor including a first ceramic body including a plurality of dielectric layers and first and second internal electrodes disposed to face each other with respective dielectric layers interposed therebetween and stacked to be perpendicular to a lower surface of the first ceramic body, and first and second external electrodes disposed on the lower surface of the first ceramic body; and a ceramic chip being coupled to the multilayer ceramic capacitor and disposed on a lower portion of the multilayer ceramic capacitor, the ceramic chip including a second ceramic body, a third ceramic body, first and second terminal electrodes disposed on upper and lower portions of the second and third ceramic bodies and connected to the first and second external electrodes, respectively, a first via electrode penetrating through the second ceramic body to thereby be connected to the first terminal electrode, and a second via electrode penetrating through the third ceramic body to thereby be connected to the second terminal electrode, in which the first and second internal electrodes include first and second leads exposed to the lower surface of the first ceramic body, respectively, and the second and third ceramic bodies are spaced apart from each other by a predetermined gap.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, exemplary embodiments of the present disclosure will now be described in detail with reference to the accompanying drawings.

Composite Electronic Component

Figure 1:
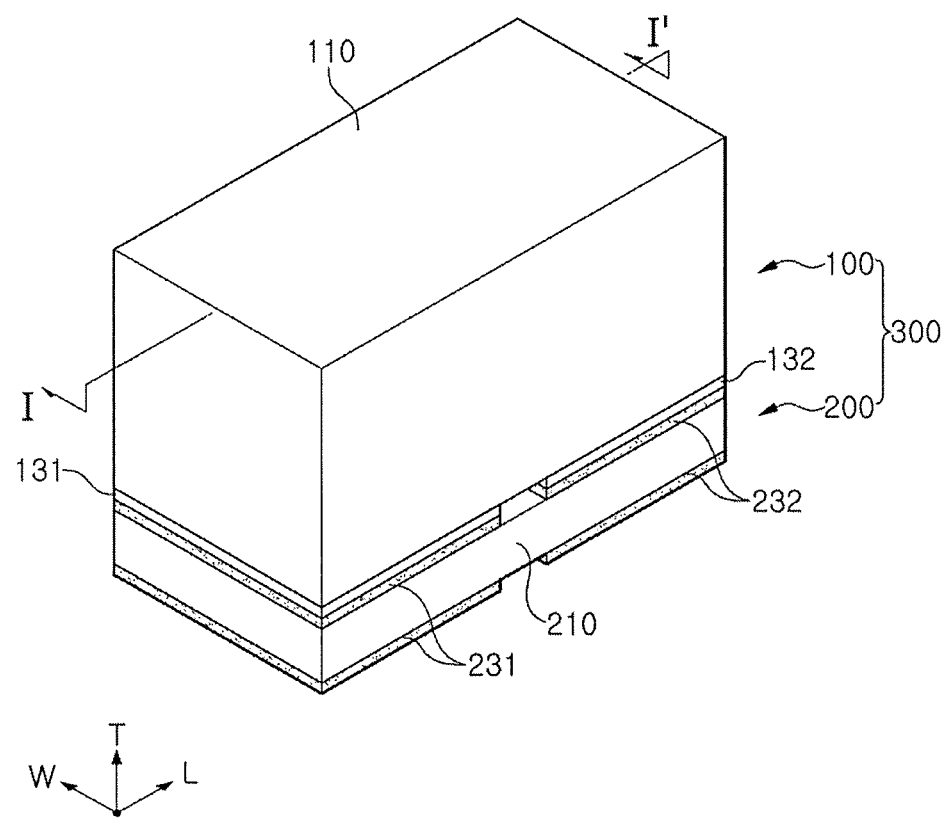
FIG. 1 is a perspective view schematically illustrating a composite electronic component according to a first exemplary embodiment in the present disclosure.

FIG. 1 is a perspective view schematically illustrating a composite electronic component according to a first exemplary embodiment in the present disclosure.

Figure 2:
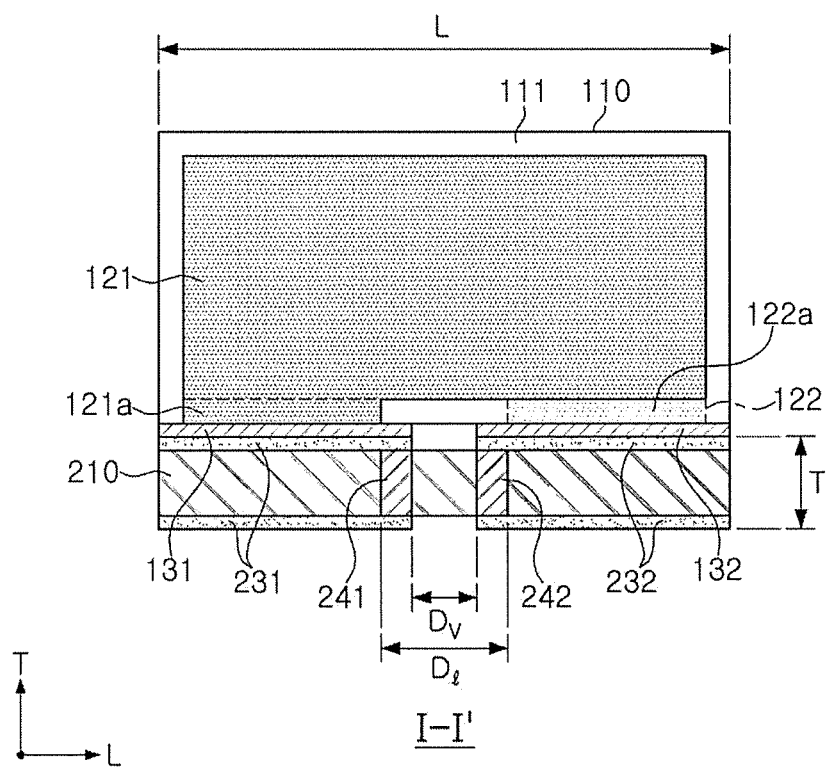
FIG. 2 is a cross-sectional view taken along line of FIG. 1.

FIG. 2 is a cross-sectional view taken along line I-I' of FIG. 1.

Referring to FIG. 1, in the composite electronic component according to an exemplary embodiment in the present disclosure, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' may be the same as a direction in which dielectric layers of a capacitor are stacked, that is, a 'stacking direction'.

Meanwhile, in an exemplary embodiment in the present disclosure, the composite electronic component may have upper and lower surfaces opposing each other, first and second end surfaces in the length direction and third and fourth side surfaces in the width direction that connect the upper and lower surfaces to each other. A shape of the composite electronic component is not particularly limited, but may be a hexahedral shape as illustrated.

In addition, the first and second end surfaces of the composite electronic component in the length direction and the third and fourth side surfaces thereof in the width direction may be defined as surfaces in the same directions as directions of first and second end surfaces of the multilayer ceramic capacitor and the ceramic chip in the length direction and third and fourth side surfaces of the multilayer ceramic capacitor and the ceramic chip in the width direction, respectively, as described below.

Meanwhile, in the composite electronic component, the multilayer ceramic capacitor and the ceramic chip may be coupled to each other, and in a case in which the ceramic chip is coupled to a lower portion of the multilayer ceramic capacitor, the upper surface of the composite electronic component may be defined as an upper surface of the multilayer ceramic capacitor, and a lower surface of the composite electronic component may be defined as a lower surface of the ceramic chip.

Referring to FIGS. 1 and 2, the composite electronic component according to the first exemplary embodiment in the present disclosure may include a composite body 300 in which a multilayer ceramic capacitor 100 and a ceramic chip 200 are coupled to each other. The multilayer ceramic capacitor 100 includes a first ceramic body 110 including a plurality of dielectric layers 111 and first and second internal electrodes 121 and 122. The first and second internal electrodes 121 and 122 are disposed to face each other with each of the dielectric layers 111 interposed therebetween and stacked to be perpendicular to the lower surface of the first ceramic body 110. First and second external electrodes 131 and 132 are disposed on the lower surface of the first ceramic body 110, and the ceramic chip 200 is disposed on a lower portion of the multilayer ceramic capacitor 100. The ceramic chip 200 includes a second ceramic body 210, first and second terminal electrodes 231 and 232 disposed on upper and lower portions of the second ceramic body 210 and connected to the first and second external electrodes 131 and 132, respectively, a first via electrode 241 penetrating through the second ceramic body 210 to thereby be connected to the first terminal electrode 231, and a second via electrode 242 penetrating through the second ceramic body 210 to thereby be connected to the second terminal electrode 232.

According to the related art, research into a composite electronic component in which a printed circuit board was used on a lower surface of a multilayer ceramic capacitor in order to decrease acoustic noise has been conducted.

In a case of using the printed circuit board on a lower surface of the multilayer ceramic capacitor as described above, acoustic noise may be decreased. However, since a current path is extended corresponding to a thickness of the printed circuit board when an alternating current voltage is applied, a side effect of increase in equivalent series inductance (ESL) may occur.

According to an exemplary embodiment in the present disclosure, although the ceramic chip 200 is disposed on the lower portion of the multilayer ceramic capacitor 100 in order to decrease acoustic noise, a current path may be shortened by adjusting a distance between leads 121a and 122a of the first and second internal electrodes 121 and 122 disposed in the multilayer ceramic capacitor 100 and a distance between the via electrodes 241 and 242 in the ceramic chip 200, such that acoustic noise may be decreased without an increase in ESL.

In detail, the first and second internal electrodes 121 and 122 may include first and second leads 121a and 122a disposed to the lower surface of the first ceramic body 110, respectively, and the distance Dl between the first and second leads 121a and 122a and the distance Dv between the first and second via electrodes 241 and 242 may be more than 150 μm, respectively.

The current path may be shortened by adjusting the distance Dl between the first and second leads 121a and 122a and the distance Dv between the first and second via electrodes 241 and 242 to be more than 150 μm, respectively, such that acoustic noise may be decreased without an increase in ESL.

when the distance Dl between the first and second leads 121a and 122a and the distance Dv between the first and second via electrodes 241 and 242 are 150 μm or less, respectively, ESL may be decreased, but the distances between the leads and between the via electrodes are excessively close, such that a short-circuit defect may occur.

According to the related art, there is a problem in that when an alternating current voltage is applied, since a current path is extended corresponding to a thickness of a printed circuit board, equivalent series inductance (ESL) is increased. However, according to an exemplary embodiment in the present disclosure, since the current path is formed along the first and second via electrodes 241 and 242 disposed in the ceramic chip 200 mounted on a printed circuit board while directly coming in contact with a mounting surface of the printed circuit board, acoustic noise may be decreased without an increase in ESL unlike the composite electronic component according to the related art.

According to an exemplary embodiment, the distance Dl between the first and second leads 121a and 122a may be equal to or less than 60% of a distance L of the first ceramic body 110.

The current path may be shortened by adjusting the distance Dl between the first and second leads 121a and 122a to be equal to or less than 60% of the distance L of the first ceramic body 110, such that acoustic noise may be decreased without an increase in ESL.

When the distance Dl between the first and second leads 121a and 122a is more than 60% of the distance L of the first ceramic body 110, the current path is not shortened and ESL is not decreased.

According to an exemplary embodiment, the distance Dv between the first and second via electrodes 241 and 242 may be equal to or less than 60% of the distance L of the first ceramic body 110.

The current path may be shortened by adjusting the distance Dv between the first and second via electrodes 241 and 242 to be equal to or less than 60% of the distance L of the first ceramic body 110, such that acoustic noise may be decreased without an increase in ESL.

When the distance Dv between the first and second via electrodes 241 and 242 is more than 60% of the distance L of the first ceramic body 110, the current path is not shortened and ESL is not decreased.

The length L of the first ceramic body 110 may be 2.0 mm or less, but is not necessarily limited thereto. The length L of the first ceramic body 110 may be more than 2.0 mm.

Hereinafter, the multilayer ceramic capacitor 100 and the ceramic chip 200 configuring the composite body 300 will be described in detail.

Referring to FIG. 2, the first ceramic body 110 configuring the multilayer ceramic capacitor 100 may be formed by stacking a plurality of dielectric layers 111, and a plurality of internal electrodes 121 and 122 (sequentially first and second internal electrodes) may be disposed in the first ceramic body 110 to be separated from each other with each of the dielectric layers 111 interposed therebetween.

The plurality of dielectric layers 111 configuring the first ceramic body 110 may be in a sintered state, and adjacent dielectric layers 111 may be integrated with each other so that boundaries therebetween are not readily apparent.

The dielectric layer 111 may be formed by sintering a ceramic green sheet containing ceramic powder, an organic solvent, and an organic binder. The ceramic powder, which is a material having high permittivity, may be a barium titanate ($BaTiO_3$) based material, a strontium titanate ($SrTiO_3$) based material, or the like, but is not limited thereto.

That is, the dielectric layers 111 configuring the first ceramic body 110 may contain a ferroelectric material, but is not necessarily limited thereto.

Meanwhile, according to the first exemplary embodiment in the present disclosure, the internal electrodes may include the first internal electrode 121 exposed to the lower surface of the multilayer ceramic capacitor 100 in the thickness direction and the second internal electrode 122 spaced apart from the first internal electrode 121 and exposed to the lower surface of the multilayer ceramic capacitor 100 in the thickness direction, but are not necessarily limited thereto.

The first internal electrode 121 may include the first lead 121a exposed to the lower surface of the multilayer ceramic capacitor 100 in the thickness direction, and the second internal electrode 122 may include the second lead 122a exposed to the lower surface of the multilayer ceramic capacitor 100 in the thickness direction.

The first and second internal electrodes 121 and 122 may be formed of a conductive paste containing a conductive metal.

The conductive metal may be nickel (Ni), copper (Cu), palladium (Pd), or alloys thereof, but is not limited thereto.

The first and second internal electrodes 121 and 122 may be printed on the ceramic green sheets forming the dielectric layers 111, using the conductive paste by a printing method such as screen printing method or a gravure printing method.

The first ceramic body 110 may be formed by alternately stacking and sintering the ceramic green sheets on which the internal electrode is printed.

The plurality of first and second internal electrodes 121 and 122 may be disposed to be perpendicular to the upper and lower surfaces of the first ceramic body 110.

Meanwhile, the first and second external electrodes 131 and 132 may be formed of a conductive paste including a conductive metal, wherein the conductive metal may be nickel (Ni), copper (Cu), palladium (Pd), gold (Au), or alloys thereof, but is not limited thereto.

Further, nickel/tin (Ni/Sn) plating layers may be further disposed on the first and second external electrodes 131 and 132.

The first and second external electrodes 131 and 132 may be disposed on the lower surface of the multilayer ceramic capacitor 100 in the thickness direction and connected to the first and second internal electrodes 121 and 122, respectively.

According to the first exemplary embodiment in the present disclosure, the ceramic chip 200 may be coupled to the lower portion of the multilayer ceramic capacitor 100 to thereby be disposed thereon.

In the ceramic chip 200, the first and second terminal electrodes 231 and 232 connected to the first and second external electrodes 131 and 132, respectively, may be disposed on upper and lower portions of the second ceramic body 210 formed of a bulk shaped ceramic material.

The first and second terminal electrodes 231 and 232 may be disposed on upper and lower portions of the second ceramic body 210, and the electrode disposed on the upper or lower portion of the second ceramic body 210 may be connected to the first and second external electrodes 131 and 132.

In general, in order to significantly decrease the transferring of vibration of a multilayer ceramic capacitor to a printed circuit board, there was an attempt to insert an intermediate medium between the multilayer ceramic capacitor and the printed circuit board.

However, since the intermediate medium is formed of a material having elasticity as a resin generally used to manufacture a printed circuit board, the intermediate medium may serve to absorb vibration of the multilayer ceramic capacitor through elasticity of the intermediate medium.

On the contrary, according to the first exemplary embodiment in the present disclosure, since the second ceramic body 210 of the ceramic chip 200 is formed of only a hard ceramic material that is not easily deformed elastically, the printed circuit board and the multilayer ceramic capacitor 100 may be spaced apart from each other by the ceramic chip 200, thereby blocking vibration itself generated in the multilayer ceramic capacitor 100 and transferred to the printed circuit board.

According to the first exemplary embodiment in the present disclosure, the second ceramic body 210 may contain a paraelectric material, but is not necessarily limited thereto.

Since the paraelectric material does not have a piezoelectric property, the paraelectric material may suppress vibration itself generated in the multilayer ceramic capacitor 100 from being transferred, such that the ceramic chip 200 including the second ceramic body 210 containing the paraelectric material is disposed on the lower portion of the multilayer ceramic capacitor 100 to decrease acoustic noise.

Further, in a case in which the second ceramic body 210 of the ceramic chip 200 is formed of the paraelectric material, it may be easy to dispose the first and second via electrodes 241 and 242 in the second ceramic body 210, such that the composite electronic component capable of decreasing acoustic noise without an increase in ESL unlike the composite electronic component according to the related art may be implemented.

That is, in a case in which the resin, alumina ($Al_2O_3$), or the like, generally used to manufacturing a printed circuit board is used in the intermediate medium as in the related art, it may be difficult to insert electrodes into the intermediate, such that it may not be easy to implement a structure according to the present disclosure.

The paraelectric material is not particularly limited as long as it has a paraelectric property. For example, the paraelectric material may be a material represented by $(Ca_{1-x}Sr_x)$ $Zr_{1-y}Ti_y)O_3$, $Ca(Zr_{1-y}Ti_y)O_3$, $Sr(Zr_{1-y}Ti_y)O_3$, $(Ca_{1-x}Sr_x)ZrO_3$, and $(Ca_{1-x}Sr_x)TiO_3$.

According to another exemplary embodiment in the present disclosure, a ceramic material configuring the second ceramic body 210 may be the same as that contained in the first ceramic body 110 configuring the multilayer ceramic capacitor 100.

That is, the ceramic material configuring the second ceramic body 210, which is a material having high permittivity, may be a barium titanate ($BaTiO_3$) based material, a strontium titanate ($SrTiO_3$) based material, or the like, but is not limited thereto.

When the ceramic material configuring the second ceramic body 210 is the same as a ferroelectric material, which is the ceramic material configuring the first ceramic body 110, the ceramic chip 200 may have a piezoelectric property, but since phases of vibration generated in the multilayer ceramic capacitor 100 and vibration in the ceramic chip 200 are different from each other, acoustic noise may be decreased.

That is, while vibration generated in the multilayer ceramic capacitor 100 is transferred to the ceramic chip 200, a phase of piezoelectric vibration is changed, such that a vibration cancellation effect may be exhibited, thereby decreasing acoustic noise.

Further, in a case in which the second ceramic body 210 of the ceramic chip 200 is formed of the same material as the dielectric material configuring the first ceramic body 110 of the multilayer ceramic capacitor 100, the composite electronic component capable of decreasing acoustic noise without an increase in ESL unlike the composite electronic component according to the related art may be implemented by disposing the first and second via electrodes 241 and 242 in the second ceramic body 210.

Meanwhile, the first and second via electrodes 241 and 242 disposed in the second ceramic body 210 may be disposed to penetrate through the second ceramic body 210.

The first via electrode 241 may penetrate through the second ceramic body 210 to thereby be connected to the first terminal electrode 231 disposed on the upper and lower portions of the second ceramic body 210.

Further, the second via electrode 242 may penetrate through the second ceramic body 210 to thereby be connected to the second terminal electrode 232 disposed on the upper and lower portions of the second ceramic body 210.

Referring to FIGS. 1 and 2, the first and second terminal electrodes 231 and 232 may be disposed on the upper and lower portions of the second ceramic body 210 and may not be disposed on both end surfaces of the second ceramic body 210 in the length direction, but are not necessarily limited thereto.

The first and second terminal electrodes 231 and 232 may be disposed on the upper and lower portions of the second ceramic body 210 and the first and second via electrodes 241 and 242 may be disposed to penetrate through the second ceramic body 210 to thereby be connected to the first and second terminal electrodes 231 and 232, such that at the time of mounting the composite electronic component on a printed circuit board, a height of solder may be decreased. Therefore, an effect of decreasing acoustic noise may be excellent.

That is, since the first and second terminal electrodes 231 and 232 are not disposed on both end surfaces of the second ceramic body 210 in the length direction, the height of the solder may be decreased and acoustic noise may be thereby decreased.

However, the first and second terminal electrodes 231 and 232 are not limited thereto, but may also be extended to and disposed on both end surfaces of the second ceramic body 210 in the length direction, respectively.

Although not particularly limited, the first and second terminal electrodes 231 and 232 may have, for example, a double layer structure composed of first and second conductive resin layers at inner portions thereof and first and second plating layers at outer portions thereof.

According to the first exemplary embodiment in the present disclosure, in a case in which the first and second terminal electrodes 231 and 232 have the double layer structure composed of the first and second conductive resin layers at the inner portions thereof and the first and second plating layers at the outer portions thereof as described above, when mechanical stress is applied thereto from the outside, the ceramic chip 200 and the conductive resin layers used as the terminal electrodes 231 and 232 of the ceramic chip 200 may suppress stress from being transferred to the multilayer ceramic capacitor 100, thereby preventing the multilayer ceramic capacitor from being damaged by cracks.

The first and second conductive resin layers may contain a conductive metal and a thermosetting resin, for example, silver (Ag) and an epoxy resin, but are not limited thereto.

A thickness T of the second ceramic chip 200 may be 0.05 mm or more to 0.6 mm or less, but is not necessarily limited thereto.

Acoustic noise may be decreased without an increase in ESL by adjusting the thickness T of the second ceramic chip 200 to be 0.05 mm to 0.6 mm.

In a case in which the thickness T of the second ceramic chip 200 is less than 0.05 mm or in a case in which the ceramic chip is not coupled, there is a problem in that acoustic noise is increased.

When the thickness T of the second ceramic chip 200 is more than 0.6 mm, there is a problem in that the effect of decreasing acoustic noise may be excellent, but ESL may be also increased.

In the multilayer ceramic capacitor according to the first exemplary embodiment in the present disclosure, the plurality of first and second internal electrodes 121 and 122 may be disposed to be perpendicular to the upper and lower surfaces of the first ceramic body 110.

That is, the first and second internal electrodes 121 and 122 may be stacked to be perpendicular to amounting surface of the composite body 300 at the time of mounting the composite body 300 on a printed circuit board.

In general, when a voltage is applied to a multilayer ceramic capacitor, a ceramic body may be repeatedly expanded and contracted in length, width, and thickness directions due to an inverse piezoelectric effect of dielectric layers.

That is, in a case of actually measuring displacement amounts of a surface (LW surface) of the ceramic body in a length-width direction, a surface (WT surface) of the ceramic body in a width-thickness direction, and a surface (LT surface) of the ceramic body in a length-thickness direction using a laser doppler vibrometer (LDV), the displacement amount is decreased in a sequence of the LW surface, the WT surface, and the LT surface.

The displacement amount of the LT surface is about 42% or so, based on that of the WT surface, such that the displacement amount of the LT surface may be smaller than that of the WT surface. The reason may be that stress having the same magnitude is generated in the LT surface and the WT surface, but particularly, since the LT surface has a relatively wide area as compared to the WT surface, stress having a similar magnitude may be distributed throughout the wide area, and relatively small deformation may thereby occur.

Therefore, it may be appreciated that in the general multilayer ceramic capacitor, the displacement amount is the smallest in the LT surface.

That is, according to the first exemplary embodiment in the present disclosure, the first and second internal electrodes 121 and 122 may be stacked to be perpendicular to the upper and lower surfaces of the first ceramic body 110, such that at the time of mounting the composite body 300 on the printed circuit board, the first and second internal electrodes 121 and 122 may be disposed to be perpendicular to the mounting surface, thereby significantly decreasing a vibration amount of a surface of the first ceramic body 110 coming in contact with the ceramic chip 200.

Figure 3:
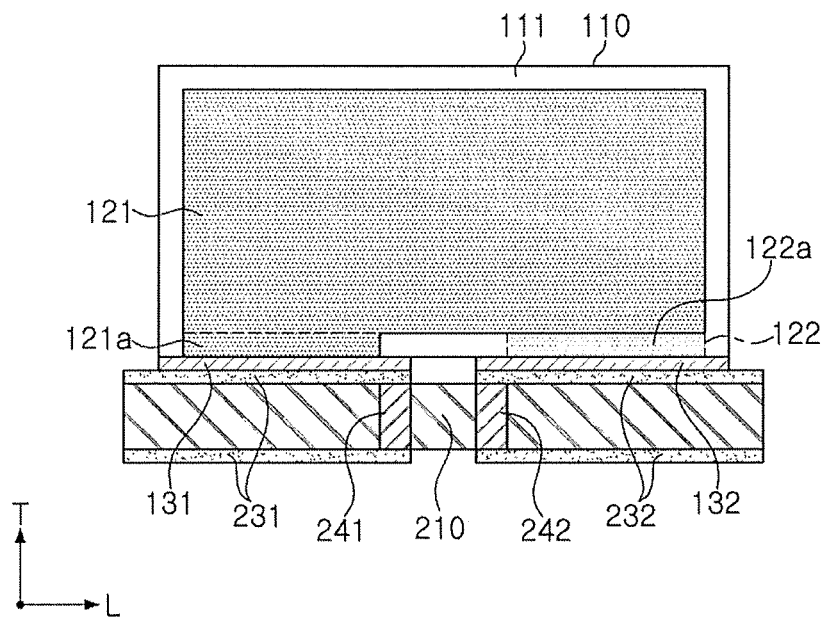
FIG. 3 is a cross-sectional view of a composite electronic component according to a second exemplary embodiment in the present disclosure, taken along line I-I' of FIG. 1.

FIG. 3 is a cross-sectional view of a composite electronic component according to a second exemplary embodiment in the present disclosure, taken along line I-I' of FIG. 1.

Referring to FIG. 3, in the composite electronic component according to the second exemplary embodiment in the present disclosure, a length of a second ceramic body 210 may be longer than that of a first ceramic body 110.

Since the length of the second ceramic body 210 is longer than that of the first ceramic body 110, at the time of mounting the composite electronic component on a printed circuit board, the second ceramic body 210 may serve to block solder from being connected to a multilayer ceramic capacitor 100 in length and width directions of the multilayer ceramic capacitor 100.

Therefore, the transferring of vibration to the printed circuit board by the solder may be further decreased.

According to another exemplary embodiment in the present disclosure, a width of the second ceramic body 210 may be wider than that of the first ceramic body 110.

Figure 4:
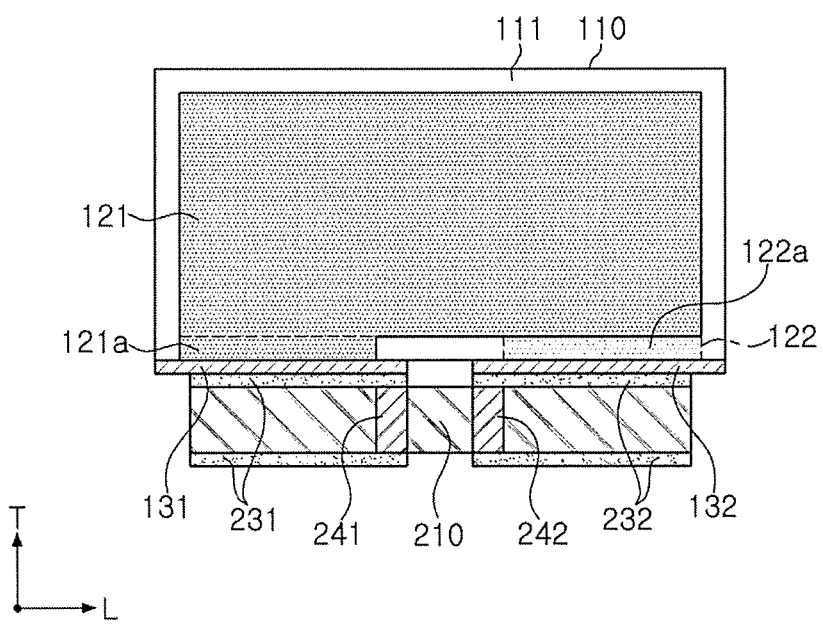
FIG. 4 is a cross-sectional view of a composite electronic component according to a third exemplary embodiment in the present disclosure, taken along line I-I' of FIG. 1.

FIG. 4 is a cross-sectional view of a composite electronic component according to a third exemplary embodiment in the present disclosure, taken along line I-I' of FIG. 1.

Referring to FIG. 4, in the composite electronic component according to the third exemplary embodiment in the present disclosure, a length of a second ceramic body 210 may be shorter than that of a first ceramic body 110.

Since the length of the second ceramic body 210 is shorter than that of the first ceramic body 110, at the time of mounting the composite electronic component on a printed circuit board, solder may be applied up to lower surfaces of first and second external electrodes 131 and 132 in a length direction of a multilayer ceramic capacitor 100, and the second ceramic body 210 may serve to block the solder from being connected up to the multilayer ceramic capacitor 100 due to a step.

That is, since the length of the second ceramic body 210 is shorter than that of the first ceramic body 110, a so-called solder pocket blocking the solder from rising up to the first and second external electrodes 131 and 132 in the length direction of the multilayer ceramic capacitor 100 may be formed.

In this structure, at the time of mounting the composite electronic component on a printed circuit board, the solder may be applied only up to the lower surfaces of the first and second external electrodes 131 and 132 in the length direction of the multilayer ceramic capacitor 100.

Therefore, the transferring of vibration to the printed circuit board by the solder may be further decreased.

According to another exemplary embodiment in the present disclosure, a width of the second ceramic body 210 may be narrower than that of the first ceramic body 110.

Figure 5:
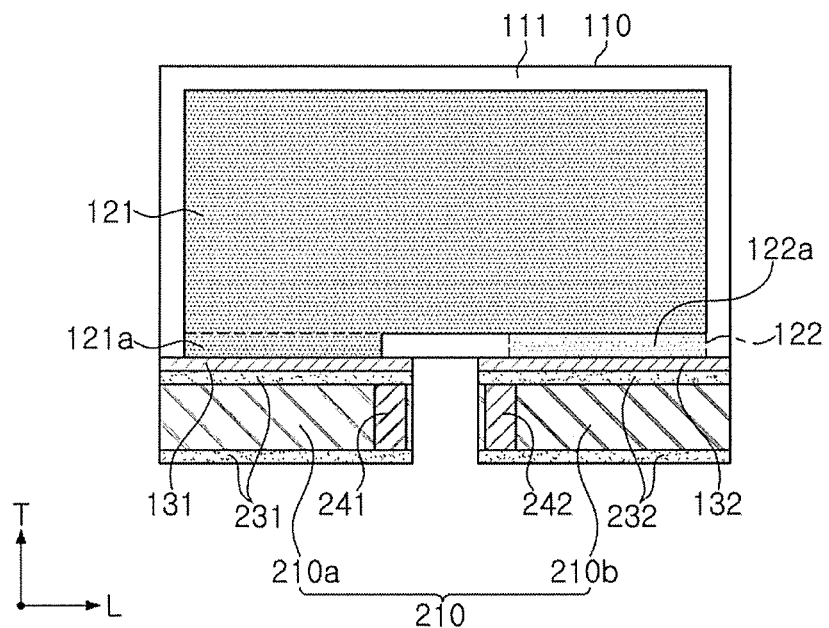
FIG. 5 is a cross-sectional view of a composite electronic component according to a fourth exemplary embodiment in the present disclosure in a length-thickness direction.

FIG. 5 is a cross-sectional view of a composite electronic component according to a fourth exemplary embodiment in the present disclosure in a length-thickness direction.

Referring to FIG. 5, the composite electronic component according to the fourth exemplary embodiment in the present disclosure may be different from the composite electronic component according to the first exemplary embodiment in the present disclosure only in view of a structure of a second ceramic body.

In detail, a second ceramic body 210 may include a third ceramic body 210a in which a first via electrode 241 is disposed and a fourth ceramic body 210b in which a second via electrode 242 is disposed, wherein the third and fourth ceramic bodies 210a and 210b may be spaced apart from each other by a predetermined interval.

The second ceramic body 210 may include two ceramic bodies 210a and 210b separated from each other, such that at the time of mounting the composite electronic component on a printed circuit board, solder may be applied onto a space between the third and fourth ceramic bodies 210a and 210b, and thus, adhesion strength may be improved.

Further, the second ceramic body 210 may include two ceramic bodies 210a and 210b separated from each other, an effect of dispersing the transferring of vibration to the printed circuit board may be exhibited, and as a result, acoustic noise may be decreased.

Figure 6:
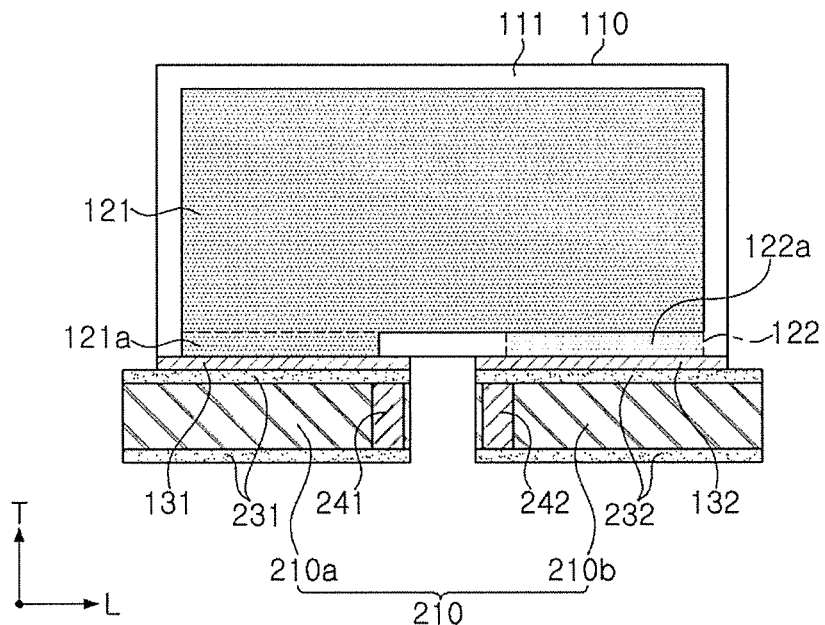
FIG. 6 is a cross-sectional view of a composite electronic component according to a fifth exemplary embodiment in the present disclosure in a length-thickness direction.

FIG. 6 is a cross-sectional view of a composite electronic component according to a fifth exemplary embodiment in the present disclosure in a length-thickness direction.

Referring to FIG. 6, the composite electronic component according to the fifth exemplary embodiment in the present disclosure may be different from the composite electronic component according to the second exemplary embodiment in the present disclosure only in view of a structure of a second ceramic body.

In detail, a second ceramic body 210 may include a third ceramic body 210a in which a first via electrode 241 is disposed and a fourth ceramic body 210b in which a second via electrode 242 is disposed, wherein the third and fourth ceramic bodies 210a and 210b may be spaced apart from each other by a predetermined interval.

Furthermore, a length of the second ceramic body 210 may be longer than that of a first ceramic body 110.

Since the length of the second ceramic body 210 is longer than that of the first ceramic body 110, at the time of mounting the composite electronic component on a printed circuit board, the second ceramic body 210 may serve to block a solder from being connected to a multilayer ceramic capacitor 100 in length and width directions of the multilayer ceramic capacitor 100.

Therefore, the transferring of vibration to the printed circuit board by the solder may be further decreased.

Figure 7:
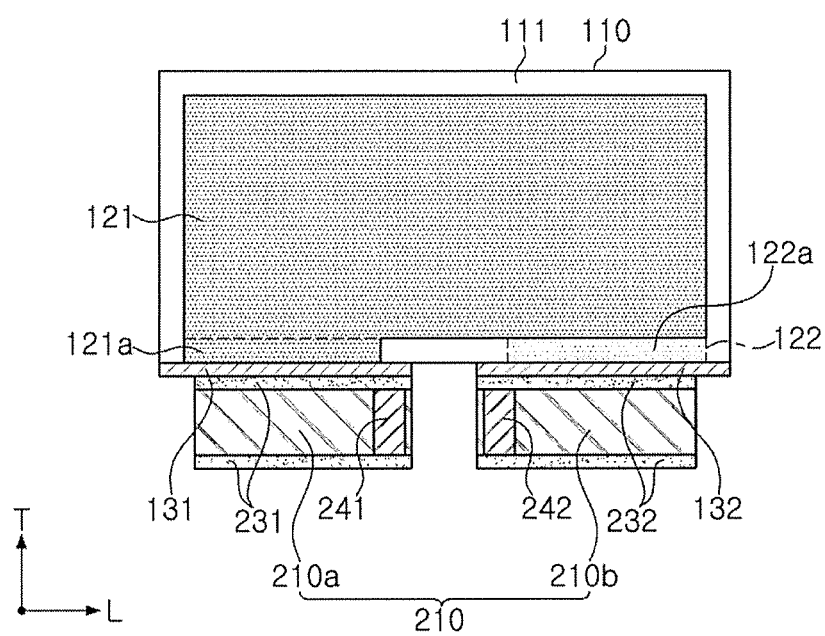
FIG. 7 is a cross-sectional view of a composite electronic component according to a sixth exemplary embodiment in the present disclosure in a length-thickness direction.

FIG. 7 is a cross-sectional view of a composite electronic component according to a sixth exemplary embodiment in the present disclosure in a length-thickness direction.

Referring to FIG. 7, the composite electronic component according to the sixth exemplary embodiment in the present disclosure may be different from the composite electronic component according to the third exemplary embodiment in the present disclosure only in view of a structure of a second ceramic body.

In detail, a second ceramic body 210 may include a third ceramic body 210a in which a first via electrode 241 is disposed and a fourth ceramic body 210b in which a second via electrode 242 is disposed, wherein the third and fourth ceramic bodies 210a and 210b may be spaced apart from each other by a predetermined interval.

A length of the second ceramic body 210 may be shorter than that of a first ceramic body 110.

Since the length of the second ceramic body 210 is shorter than that of the first ceramic body 110, at the time of mounting the composite electronic component on a printed circuit board, solder may be applied up to lower surfaces of first and second external electrodes 131 and 132 in a length direction of a multilayer ceramic capacitor 100, and the second ceramic body 210 may serve to block the solder from being connected up to the multilayer ceramic capacitor 100 due to a step.

That is, since the length of the second ceramic body 210 is shorter than that of the first ceramic body 110, a so-called solder pocket blocking the solder from rising up to the first and second external electrodes 131 and 132 in the length direction of the multilayer ceramic capacitor 100 may be formed.

In this structure, at the time of mounting the composite electronic component on a printed circuit board, the solder may be applied only up to the lower surfaces of the first and second external electrodes 131 and 132 in the length direction of the multilayer ceramic capacitor 100.

Figure 8:
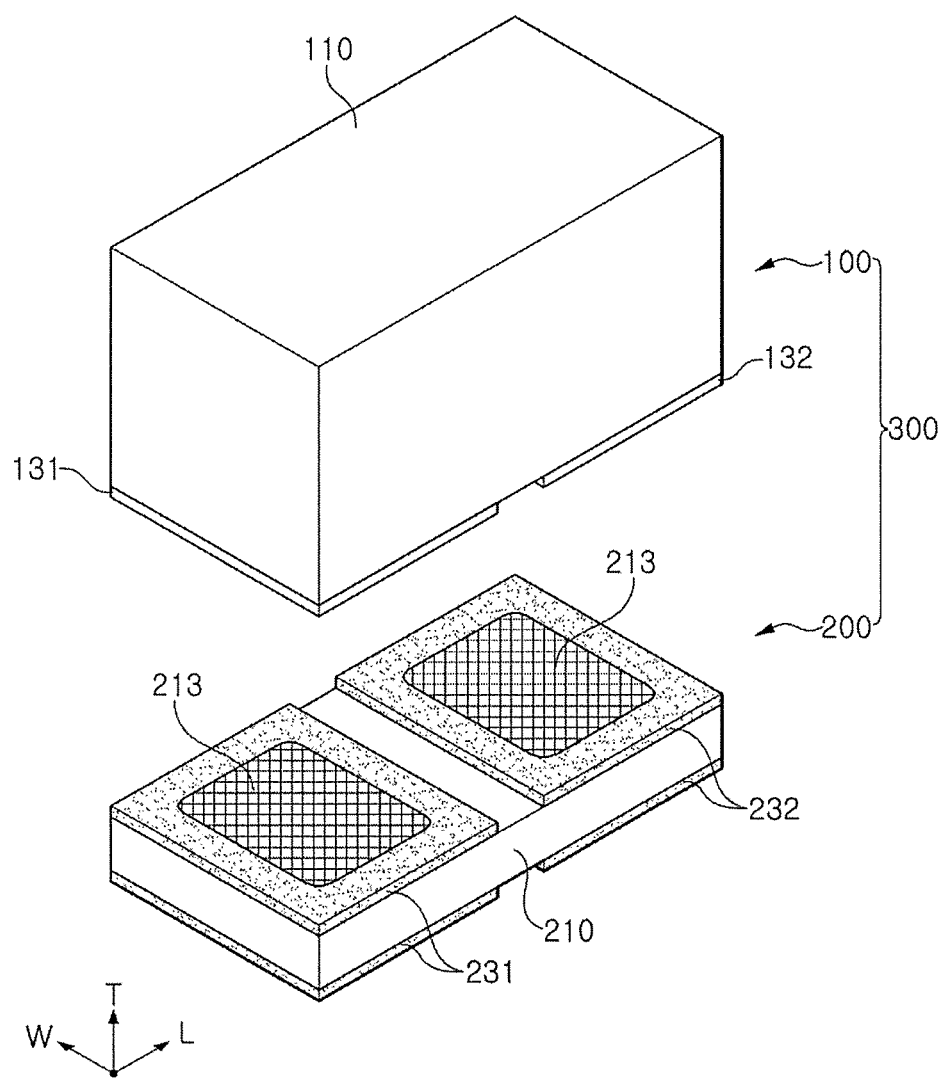
FIG. 8 is an exploded perspective view separately illustrating a multilayer ceramic capacitor and a ceramic chip of the composite electronic component of FIG. 1.

FIG. 8 is an exploded perspective view separately illustrating a multilayer ceramic capacitor and a ceramic chip of the composite electronic component of FIG. 1.

The composite body 300 may be formed by coupling the multilayer ceramic capacitor 100 and the ceramic chip 200 to each other, and a method of forming the composite body 300 is not particularly limited.

The composite body 300 may be formed by coupling the multilayer ceramic capacitor 100 and the ceramic chip 200 that are separately manufactured to each other using a high-melting point solder, a conductive adhesive 213, or the like.

The conductive adhesive 213 may be a paste containing a conductive metal and an epoxy resin, but is not necessarily limited thereto.

Referring to FIG. 8, in a case of coupling the multilayer ceramic capacitor 100 and the ceramic chip 200 using the high-melting point solder, the conductive adhesive 213, or the like, the conductive paste 213 may be applied onto the lower surfaces of the first and second external electrodes 131 and 132 to thereby be adhered to the first and second terminal electrodes 231 and 232 of the ceramic chip 200.

The high-melting point solder or the conductive adhesive 213 may be applied onto the lower surfaces of the first and second external electrodes 131 and 132 to thereby be fixed to the ceramic chip 200 at the lower surface of the multilayer ceramic capacitor 100, such that only vibration of the surface (LW surface) of the first ceramic body 110 in the length-width direction may be transferred to the ceramic chip 200.

Therefore, the transferring of stress and vibration generated in the multilayer ceramic capacitor to the ceramic chip may be significantly decreased, such that acoustic noise may be decreased.

Board Having Composite Electronic Component

Figure 9:
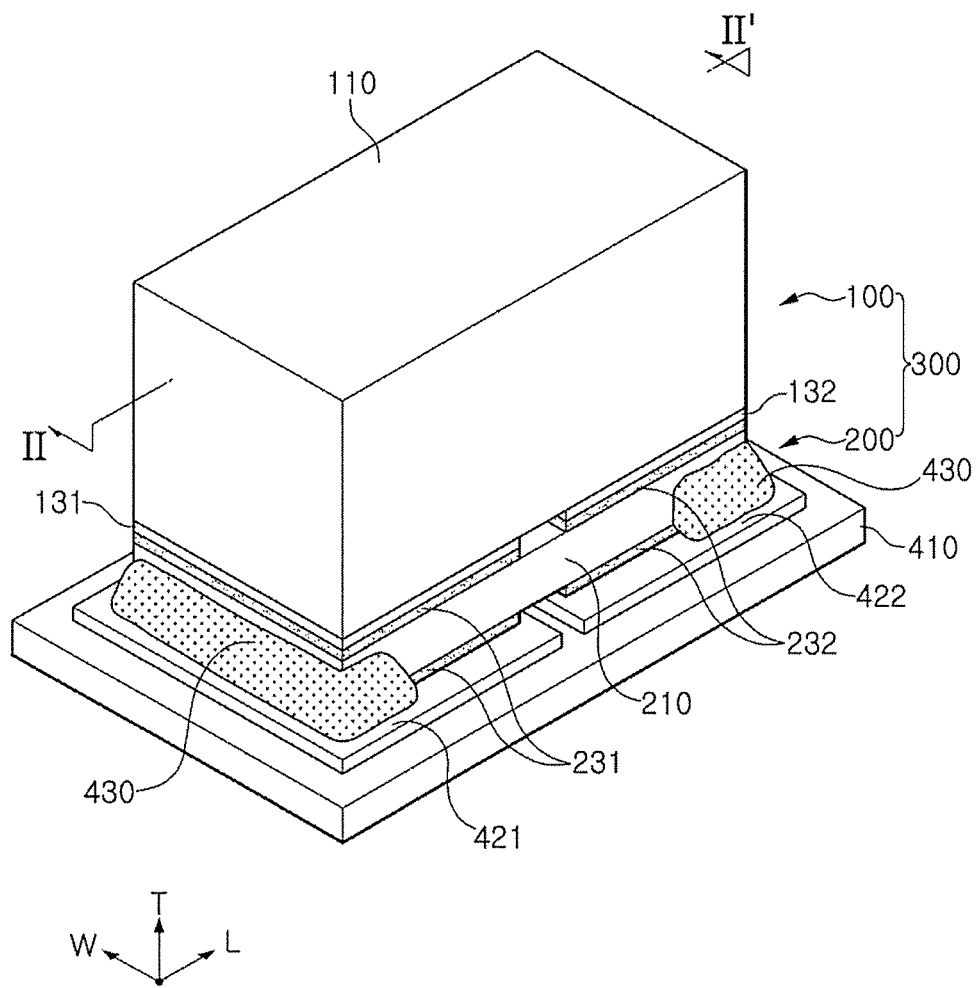
FIG. 9 is a perspective view illustrating a board in which the composite electronic component of FIG. 1 is mounted on a printed circuit board.

FIG. 9 is a perspective view illustrating a board in which the composite electronic component of FIG. 1 is mounted on a printed circuit board.

Figure 10:
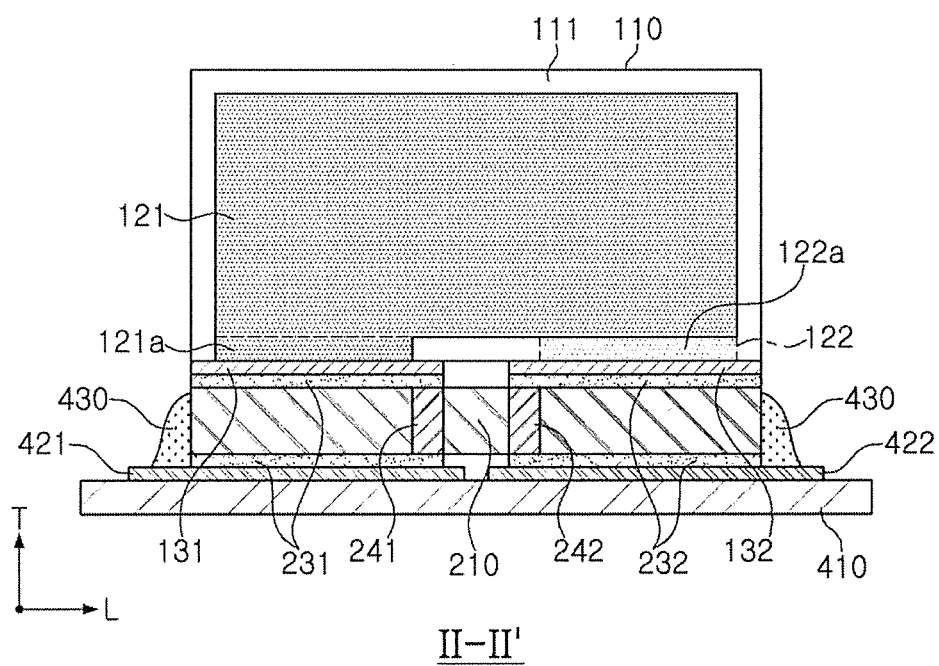
FIG. 10 is a cross-sectional view taken along line II-II' of FIG. 9.

FIG. 10 is a cross-sectional view taken along line II-II' of FIG. 9.

Referring to FIGS. 9 and 10, a board 400 having a composite electronic component according to the present exemplary embodiment may include a printed circuit board 410 and two electrode pads 421 and 422 formed on an upper surface of the printed circuit board 410.

The electrode pads 421 and 422 may be composed of first and second electrode pads 421 and 422 connected to the first and second terminal electrodes 231 and 232 of the ceramic chip 200 of the composite electronic component, respectively.

In this case, the first and second terminal electrodes 231 and 232 of the ceramic chip 200 may be electrically connected to the printed circuit board 410 by solder 430 in a state in which first and second terminal electrodes 231 and 232 are positioned to contact the first and second electrode pads 421 and 422, respectively.

When a voltage is applied in a state in which the composite electronic component is mounted on the printed circuit board 410 as described above, acoustic noise may be generated.

That is, when voltages having different polarities are applied to the first and second external electrodes 131 and 132 disposed on both end surfaces of the multilayer ceramic capacitor 100 of the composite electronic component in the length direction in a state in which the composite electronic component is mounted on the printed circuit board 410, the first ceramic body may be expanded and contracted in the thickness direction by an inverse piezoelectric effect of the dielectric layer 111, and both side portions of the first and second external electrodes 131 and 132 may be contracted and expanded by a Poisson effect as opposed to expansion and contraction of the first ceramic body 110 in the thickness direction.

Here, in the composite electronic component according to the exemplary embodiment in the present disclosure, the ceramic chip 200 may be disposed on the lower portion of the multilayer ceramic capacitor 100, such that at the time of mounting the composite electronic component on the printed circuit board, a problem that the solder rises up to the first and second external electrodes 131 and 132 of the multilayer ceramic capacitor 100 may be prevented. Further, piezoelectric stress from being directly transferred may be thereby blocked from the multilayer ceramic capacitor 100 to the printed circuit board through the first and second external electrodes 131 and 132. Therefore, acoustic noise may be further decreased.

That is, at the time of mounting the composite electronic component on the printed circuit board, the transferring of vibrations of the capacitor due to the inverse piezoelectric property of the capacitor to the printed circuit board may be decreased, such that acoustic noise may be decreased.

Hereafter, although the present disclosure will be described in detail with reference to Inventive Examples, the present disclosure is not limited thereto.

EXPERIMENTAL EXAMPLE

Composite electronic components according to Inventive Examples and Comparative Examples were manufactured as follows.

In Comparative Example 1, which is a reference example for comparing acoustic noise levels and ESL values of the composite electronic components according to Inventive Example and Comparative Example, and only a multilayer ceramic capacitor was manufactured as a single component without disposing a ceramic chip on a lower portion of the multilayer ceramic capacitor.

In Inventive Examples 1 to 6, which are examples of the composite electronic component according to the exemplary embodiment in the present disclosure, a ceramic chip was disposed on a lower portion of a multilayer ceramic capacitor.

More specifically, in Inventive Examples 1 to 6, the composite electronic components were manufactured while variously changing a distance Dl between first and second leads 121a and 122a and a distance Dv of first and second via electrodes 241 and 242.

In Comparative Example 2, which is an example of a composite electronic component according to Comparative Example of the present disclosure, a composite electronic component was manufactured so that a ceramic chip was disposed on a lower portion of a multilayer ceramic capacitor but a distance Dl between first and second leads 121a and 122a and a distance Dv of first and second via electrodes 241 and 242 were 150 μm.

The ceramic chips in Inventive Examples 1 to 6 and Comparative Example 2 were manufactured at a thickness of 0.3 mm.

The following Table 1 illustrates results obtained by measuring equivalent series inductance (ESL) values (pH) of the samples in Comparative Examples 1 and 2 and Samples in Inventive Examples 1 to 6 in a state in which each of the samples was mounted on a printed circuit board.

TABLE 1

|  | Distance Dl between First and Second Leads (μm) | Distance Dv of First and Second Via Electrodes (μm) | ESL (pH) |
| --- | --- | --- | --- |
| Comparative Example 1 | — | — | 280 |
| Inventive Example 1 | 1950 | 1900 | 825 |
| Inventive Example 2 | 800 | 800 | 625 |
| Inventive Example 3 | 500 | 500 | 490 |
| Inventive Example 4 | 300 | 300 | 415 |
| Inventive Example 5 | 250 | 250 | 377 |
| Inventive Example 6 | 200 | 200 | 355 |
| Comparative Example 2 | 150 | 150 | 343 |

Referring to Table 1, in Comparative Example 1, there was a problem in that the ESL generated in a case of mounting a general multilayer ceramic capacitor on a printed circuit board was measured to be low (280 pH), but the acoustic noise level was high.

In Inventive Examples 1 to 6, corresponding to the composite electronic components according to the exemplary embodiment in the present disclosure, a current path was decreased by adjusting the distance Dl between first and second leads 121a and 122a and the distance Dv between the first and second via electrodes 241 and 242 to be more than 150 μm, respectively, such that acoustic noise may be decreased without an increase in ESL.

On the contrary, in Comparative Example 2 in which the distance Dl between the first and second leads 121a and 122a and the distance Dv between the first and second via electrodes 241 and 242 were 150 μm, respectively, the ESL value was decreased, but the distances between the leads and between the via electrodes were excessively close, such that a short-circuit defect occurred, thereby causing a problem in reliability.

As set forth above, according to exemplary embodiments in the present disclosure, stress or vibrations due to the piezoelectric property of the multilayer ceramic capacitor may be alleviated by the ceramic chip, such that the acoustic noise generated in the printed circuit board may be decreased.

At the same time, in the composite electronic component according to the related art in which the ceramic chip is disposed on the lower portion of the multilayer ceramic capacitor, a side effect that ESL is increased may occur, but according to the embodiments in the present disclosure, the current path may be decreased by adjusting the distance between the leads of the first and second internal electrodes disposed in the multilayer ceramic capacitor and the distance between the via electrodes in the ceramic chip, such that acoustic noise may be decreased without an increase in ESL.

Further, the internal electrodes of the multilayer ceramic capacitor may be stacked perpendicularly to the mounting surface of the composite body, and the surface of the first ceramic body in the length-width direction of which a piezoelectric displacement amount is small may be adhered to the ceramic chip, such that the transferring of stress and vibration generated in the multilayer ceramic capacitor to the ceramic chip may be significantly decreased, thereby decreasing acoustic noise.

In addition, the step may be formed between the multilayer ceramic capacitor and the ceramic chip, such that the transferring of vibration to the printed circuit board by the solder may be significantly decreased by blocking the solder from being formed in the thickness direction of the multilayer ceramic capacitor.

While exemplary embodiments have been shown and described above, it will be apparent to those skilled in the art that modifications and variations could be made without departing from the scope of the present invention as defined by the appended claims.

What is claimed is:

1. A composite electronic component comprising a composite body including:
   a multilayer ceramic capacitor including a first ceramic body including a plurality of dielectric layers and first and second internal electrodes disposed to face each other with respective dielectric layers interposed therebetween and stacked to be perpendicular to a lower surface of the first ceramic body, and first and second external electrodes disposed on the lower surface of the first ceramic body; and
   a ceramic chip being coupled to the multilayer ceramic capacitor and disposed on a lower portion of the multilayer ceramic capacitor, the ceramic chip including a second ceramic body, first and second terminal electrodes disposed on upper and lower portions of the second ceramic body and connected to the first and second external electrodes, respectively, a first via electrode penetrating through the second ceramic body to thereby be connected to the first terminal electrode, and a second via electrode penetrating through the second ceramic body to thereby be connected to the second terminal electrode,
   wherein the first and second internal electrodes include first and second leads exposed to the lower surface of the first ceramic body, respectively,
   wherein the first and second leads are spaced apart from each other by a first predetermined interval, and the first and second via electrodes are spaced apart from each other by a second predetermined interval, and
   wherein the first predetermined interval and the second predetermined interval are more than 150 μm, respectively.

2. The composite electronic component of claim 1, wherein the first predetermined interval is 60% or less of a length of the first ceramic body.

3. The composite electronic component of claim 1, wherein the second predetermined interval is 60% or less of a length of the first ceramic body.

4. The composite electronic component of claim 1, wherein the second ceramic body includes a third ceramic body in which the first via electrode is disposed and a fourth ceramic body in which the second via electrode is disposed, the third and fourth ceramic bodies being spaced apart from each other by a predetermined gap.

5. The composite electronic component of claim 1, wherein the multilayer ceramic capacitor and the ceramic chip are coupled to each other by a conductive adhesive.

6. The composite electronic component of claim 1, wherein a length of the ceramic chip is longer than that of the multilayer ceramic capacitor.

7. The composite electronic component of claim 6, wherein a width of the ceramic chip is wider than that of the multilayer ceramic capacitor.

8. The composite electronic component of claim 1, wherein a length of the ceramic chip is shorter than that of the multilayer ceramic capacitor.

9. The composite electronic component of claim 1, wherein a length of the ceramic chip is shorter than that of the multilayer ceramic capacitor and a width of the ceramic chip is narrower than that of the multilayer ceramic capacitor.

10. The composite electronic component of claim 1, wherein a thickness of the ceramic chip is 0.05 mm or more, or 0.6 mm or less.

11. A board having a composite electronic component, the board comprising:
    a printed circuit board on which a plurality of electrode pads are formed;
    the composite electronic component of claim 1, mounted on the printed circuit board; and
    a solder connecting the electrode pads and the composite electronic component to each other.

12. The board of claim 11, wherein the first predetermined interval and the second predetermined interval are more than 150 μm, respectively.

13. The board of claim 11, wherein the first predetermined interval is 60% or less of a length of the first ceramic body.

14. The board of claim 11, wherein the second predetermined interval is 60% or less of a length of the first ceramic body.

15. The board of claim 11, wherein the second ceramic body includes a third ceramic body in which the first via electrode is disposed and a fourth ceramic body in which the second via electrode is disposed, the third and fourth ceramic bodies being spaced apart from each other by a predetermined interval.

16. A composite electronic component comprising a composite body including:
    a multilayer ceramic capacitor including a first ceramic body including a plurality of dielectric layers and first and second internal electrodes disposed to face each other with respective dielectric layers interposed therebetween and stacked to be perpendicular to a lower surface of the first ceramic body, and first and second external electrodes disposed on the lower surface of the first ceramic body; and
    a ceramic chip being coupled to the multilayer ceramic capacitor and disposed on a lower portion of the multilayer ceramic capacitor, the ceramic chip including a second ceramic body, a third ceramic body, first and second terminal electrodes disposed on upper and lower portions of the second and third ceramic bodies and connected to the first and second external electrodes, respectively, a first via electrode penetrating through the second ceramic body to thereby be connected to the first terminal electrode, and a second via electrode penetrating through the third ceramic body to thereby be connected to the second terminal electrode,
    wherein the first and second internal electrodes include first and second leads exposed to the lower surface of the first ceramic body, respectively, and
    wherein the second and third ceramic bodies are entirely spaced apart from each other by a predetermined gap.

17. The composite electronic component of claim 16, wherein the first and second leads are spaced apart from each other by a first predetermined interval, and the first and second via electrodes are spaced apart from each other by a second predetermined interval.

18. The composite electronic component of claim 17, wherein the first predetermined interval and the second predetermined interval are more than 150 μm, respectively.

* * * * *